(12) United States Patent
Lee et al.

(10) Patent No.: US 6,972,807 B2
(45) Date of Patent: Dec. 6, 2005

(54) PROJECTION TELEVISION AND CONVERGENCE CONTROL METHOD THEREOF

(75) Inventors: Suk-sun Lee, Anyang-si (KR); Il-hyun Ryu, Suwon-si (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 424 days.

(21) Appl. No.: 10/230,087

(22) Filed: Aug. 29, 2002

(65) Prior Publication Data

US 2003/0076450 A1    Apr. 24, 2003

(30) Foreign Application Priority Data

Oct. 24, 2001    (KR) ............................... 2001-65668

(51) Int. Cl.[7] ............................................. H04N 5/74
(52) U.S. Cl. ....................................................... 348/745
(58) Field of Search ................................. 348/806, 807, 348/745, 746; 315/368.11, 368.18, 368.24

(56) References Cited

U.S. PATENT DOCUMENTS

| | | | |
|---|---|---|---|
| 3,943,279 A | * 3/1976 | Austefjord | 348/747 |
| 4,868,668 A | 9/1989 | Tavernetti | |
| 4,935,674 A | * 6/1990 | Rodriguez-Cavazos | 315/368.13 |
| 5,473,224 A | * 12/1995 | Tsujihara et al. | 315/368.18 |
| 5,835,029 A | * 11/1998 | Fujiwara et al. | 341/50 |
| 6,268,887 B1 | * 7/2001 | Watanabe et al. | 348/554 |
| 6,333,768 B1 | * 12/2001 | Kawashima et al. | 348/806 |
| 6,600,276 B2 | * 7/2003 | Lee | 315/368.11 |
| 6,606,130 B1 | * 8/2003 | George | 348/744 |

FOREIGN PATENT DOCUMENTS

| | | |
|---|---|---|
| DE | 39 36 789 A1 | 5/1991 |
| EP | 0 703 714 A2 | 3/1996 |
| WO | WO 00/64188 A1 | 10/2000 |

* cited by examiner

Primary Examiner—Paulos M. Natnael
(74) Attorney, Agent, or Firm—Sughrue Mion, PLLC

(57) ABSTRACT

A projection television and a convergence control method thereof are provided. The projection television, which magnifies images displayed on cathode ray tubes (CRTs) for the colors red, green, and blue using lenses and projects the magnified images onto a screen, includes a convergence control apparatus capable of adjusting the convergence while an input image signal is displayed, the convergence control apparatus including: an image signal decoder which processes the input image signal to generate a data signal, horizontal and vertical synchronous signals, and a start signal indicating the start of either the horizontal or vertical synchronous signal; a convergence control unit which normally projects an image signal output from the image signal decoder onto the screen and performs convergence control using a predetermined region of the screen displaced from a visible region of the screen according to a convergence control command; and a main microcomputer which inputs the convergence control command to the convergence control unit when the start signal is input from the image signal decoder, stops the convergence control when a completion signal is input from the convergence control unit, and performs a control operation to continuously display the image signal during the convergence control.

6 Claims, 5 Drawing Sheets

PROJECTION TELEVISION AND CONVERGENCE CONTROL METHOD THEREOF

BACKGROUND OF THE INVENTION

1. Field of the Invention

The present invention relates to projection televisions, and more particularly, to a projection television and a convergence control method thereof. The present application is based on Korean Patent Application No. 2001-65668, filed Oct. 24, 2001, which is incorporated herein by reference.

2. Description of the Related Art

Projection televisions display a magnified image on a screen in connection with, for example, liquid crystal display (LCD) or ferro-electric liquid crystal display panels or cathode ray tubes (CRTs). A projection television with a CRT includes three CRTs for the colors red (R), green (G), and blue (B). After deflection by a deflection yoke and convergence control by a convergence yoke, the images from the R, G, and B CRTs are projected through projection lenses to display magnified images on the screen. Due to the large size of the projection television screen, more accurate convergence control is needed to precisely superimpose the red, green, and blue images.

FIG. 1 shows a screen 10 for conventional convergence control where the convergence is adjusted by matching red and blue patterns 12. As illustrated in FIG. 1, this conventional method controls the convergence by matching the red and blue patterns 12. As a result, there is a problem of misconvergence when the convergence of a green pattern, a reference for convergence control of the red and blue patterns, is affected by the earth's magnetic field which varies depending on the receiving location.

For this reason, projection televisions have been designed to permit manual convergence control by a user after being purchased. However, conventional projection televisions structurally interrupt normal display during convergence control. While a viewer watches TV in a normal mode, the displayed program may be interrupted for about 30 seconds for convergence control to be performed.

SUMMARY OF THE INVENTION

To solve the above-described problems, it is a first object of the present invention to provide a projection television enabling normal display while convergence control is performed.

It is a second object of the present invention to provide a convergence control method of the projection television.

To achieve the first object of the present invention, there is provided a projection television which magnifies images displayed on cathode ray tubes (CRTs) for the colors red, green, and blue using lenses and projects the magnified images onto a screen, the projection television comprising a convergence control apparatus capable of adjusting the convergence while an input image signal is displayed, the convergence control apparatus comprising: an image signal decoder which processes the input image signal to generate a data signal, horizontal and vertical synchronous signals, and a start signal indicating the start of either the horizontal or vertical synchronous signal; a convergence control unit which normally projects an image signal output from the image signal decoder onto the screen and performs convergence control using a predetermined region of the screen displaced from a visible region of the screen according to a convergence control command; and a main microcomputer which inputs the convergence control command to the convergence control unit when the start signal is input from the image signal decoder, stops the convergence control when a completion signal is input from the convergence control unit, and performs a control operation to continuously display the image signal during the convergence control.

It is preferable that the convergence control unit comprises: a convergence microcontroller which generates a command to generate the predetermined convergence control pattern signal according to the convergence control command from the main microcomputer, the predetermined convergence control pattern signal for projecting a convergence control image pattern onto the predetermined region, and generates control data based on position data of the predetermined convergence control image pattern signal; a pattern signal generator which generates the predetermined convergence control pattern signal in response to the command to generate the predetermined convergence control pattern signal, which is output from the convergence microcomputer, and inputs the predetermined convergence control pattern signal to the image signal amplifier; optical sensors which are positioned at the predetermined region of the screen and generates position signals by sensing the convergence control image pattern projected onto the predetermined region of the screen according to the convergence control pattern signal; an analog-to-digital converter which converts the position signals from the optical sensors into digital data and inputs the digital data as the position data to the convergence microcomputer; and a convergence control circuit which adjusts the quantity of current flowing across a convergence yoke of each of the CRTs according to the control data from the convergence microcomputer.

To achieve the second object of the present invention, there is provided a convergence control method of a projection television which magnifies images displayed on CRTs for the colors red, green, and blue using lenses and projects the magnified images onto a screen, the convergence control method comprising: when a power voltage is applied to the projection television, detecting the start of a synchronous signal of an input image signal; when the start of the synchronous signal of the image signal is detected, generating a predetermined convergence control pattern signal; and adjusting the convergence of the projection television according to the predetermined convergence control pattern signal while a normal image is projected onto and displayed on the screen, wherein a convergence control image pattern corresponding to the convergence control pattern signal is projected onto a predetermined region of the screen displaced from a visible region of the screen to adjust the convergence.

According to the present invention described above, since convergence control is performed using only a limited region of the projection television screen, convergence variations due to, for example, the earth's magnetic field, can be controlled without interrupting TV viewing.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Preferred embodiments of a projection television and a convergence control method thereof will be described in greater detail with reference to the appended drawings. A preferred embodiment of the projection television according to the present invention will be described first.

Figure 1:
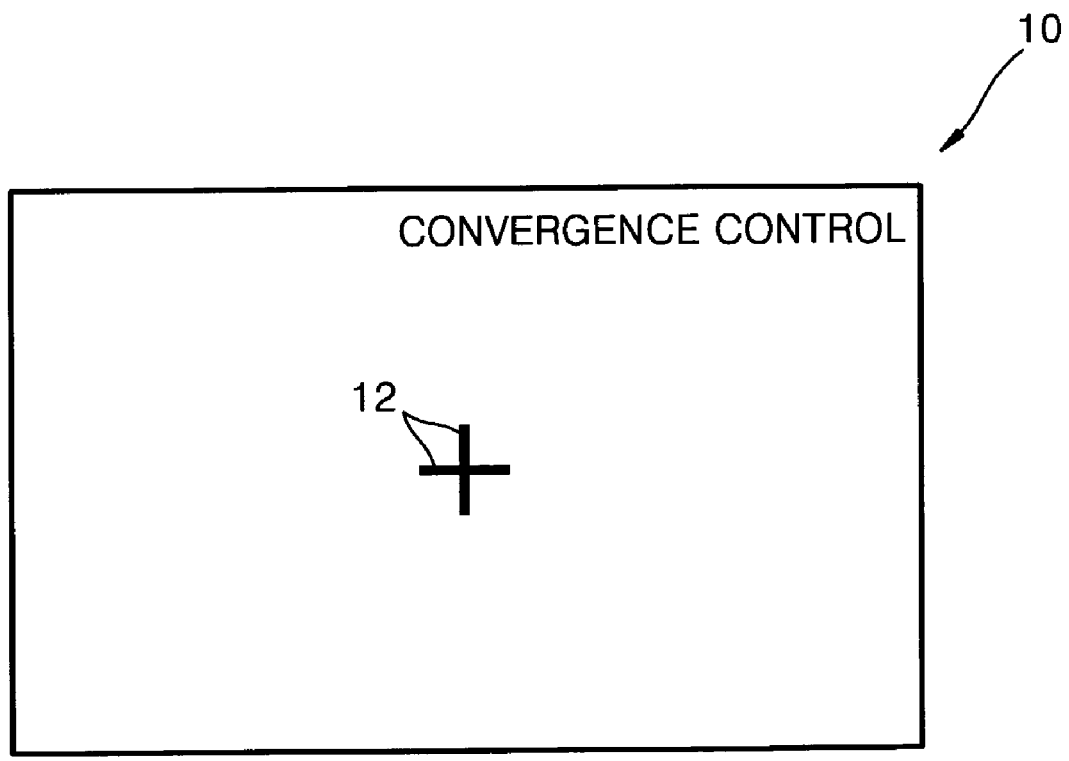
FIG. 1 is a front view of a projection television displaying a convergence control screen in the prior art.
Figure 2:
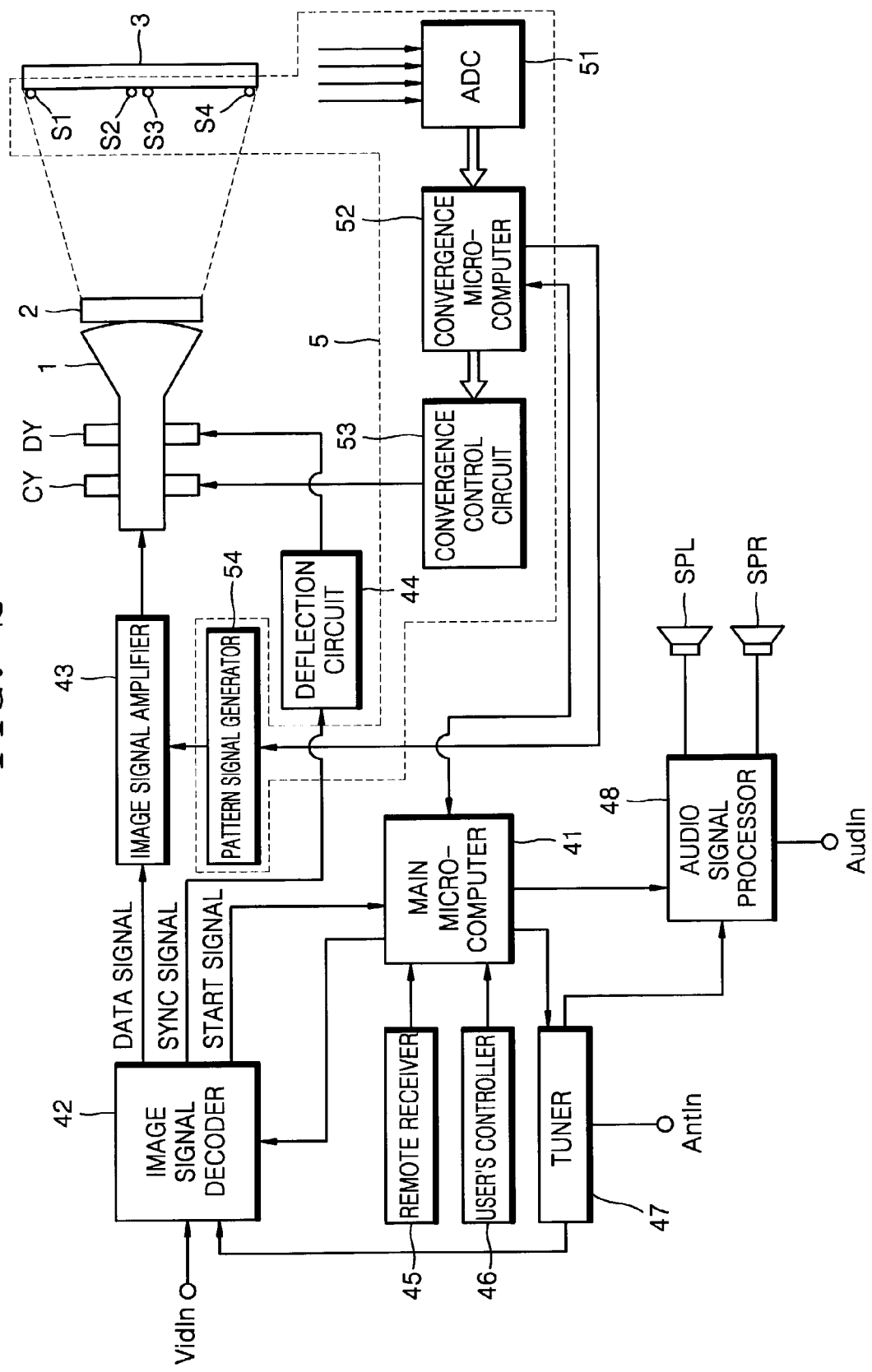
FIG. 2 is a block diagram showing the internal structure of a projection television according to a preferred embodiment of the present invention.

Referring to FIG. 2, a projection television including a convergence control apparatus according to the present invention includes an image signal decoder 42, a convergence control unit 5, a main microcomputer 41, an image signal amplifier 43, a deflection circuit 44, a remote receiver 45, a user's controller 46, a tuner 47, an audio signal processor 48, and speakers SPL and SPR. The convergence control apparatus according to the present invention includes the image signal decoder 42, the convergence control unit 5, the main microcomputer 41, and the image signal amplifier 43.

The image signal decoder 42 processes an input image signal to generate a data signal, a horizontal synchronous (sync) signal, and a vertical sync signal. The image signal generate 42 also generates a start signal indicating the start of either of the horizontal and vertical sync signals. The input image signal refers to the image signal input to the image signal decoder 42 from an image signal input port VidIn or the tuner 47. The convergence control unit 5 performs convergence control according to a convergence control command input from the main microcomputer 41 and generates a completion signal after the convergence control is complete. When the start signal is generated by the image signal decoder 42, the main microcomputer 41 outputs a convergence control instruction to a convergence microcomputer of the convergence control unit 5. When the completion signal is generated by the convergence microcomputer 52, the main microcomputer 41 controls the image signal decoder 42, the tuner 47, and the audio signal processor 48 in accordance with a user control signal from the remote receiver 45 or the user's controller 46.

As described above, after the start signal indicating the input of an image signal is generated by the image signal decoder 42 and, in response to the start signal, the convergence control command from the main microcomputer 41 is input to the convergence microcomputer 52, convergence control is conducted using a predetermined limited region of a screen 3. Accordingly, the user can continue to watch TV through the screen except for the predetermined limited region while the convergence control is performed.

The deflection circuit 44 periodically controls the quantity of current flowing across a deflection yoke DY in accordance with the vertical and horizontal sync signals output from the image signal decoder 42. The image signal amplifier 43 amplifies one of the data signal from the image signal decoder 42 and a convergence control pattern signal from a pattern signal generator 54 of the convergence control unit 5 and outputs the amplified signals to CRTs 1. The output signals from the image signal amplifier 42 includes red, green, and blue signals. Each of the red, green, and blue signals is applied to a respective CRT 1 to control the amount of emission of electron beams of each color.

The convergence control unit 5, which projects a convergence control pattern onto the predetermined limited region of the screen 3 for convergence control, includes an analog-to-digital converter (ADC) 51, the convergence microcomputer 52, the pattern signal generator 54, and optical sensors S1, S2, S3, and S4. The convergence microcomputer 52 outputs a command to the pattern signal generator 54 to generate the convergence control pattern signal, in response to the convergence control command from the main microcomputer 41, and generates control data corresponding to the position data of the convergence control pattern signal from the ADC 51. Upon receipt of the command to generate the convergence control pattern signal, the pattern signal generator 54 generates the convergence control pattern signal and outputs it to the image signal amplifier 43. The optical sensors S1, S2, S3, and S4 are located in predetermined positions of the screen 3 and generate position signals of the images projected according to the convergence control pattern signal. The ADC 51 converts the position signals detected by and output from the optical sensors S1, S2, S3, and S4 to digital data and outputs the digital data as position data to the convergence microcomputer 52. The convergence control circuit 53 controls the quantity of current flowing across the convergence yoke CY of each of the CRTs 1 according to the control data from the convergence microcomputer 52.

The user's controller 46 outputs a command according to a user's direct manipulation to the main microcomputer 41. The remote receiver 45 receives a transmission signal from a remote controller (not shown) manipulated by the user to input a corresponding command to the main microcomputer 41. The tuner 47 processes an antenna signal from an antenna input port AntIn to generate an image signal and an audio signal. The image signal from the tuner 47 is input to the image signal decoder 42, and the audio signal is input to the audio signal processor 48. The audio signal processor 48 processes the audio signal from the tuner 47 or the audio input port AntIn it receives and outputs the processed audio signal through the speakers SPL and SPR.

Figure 3:
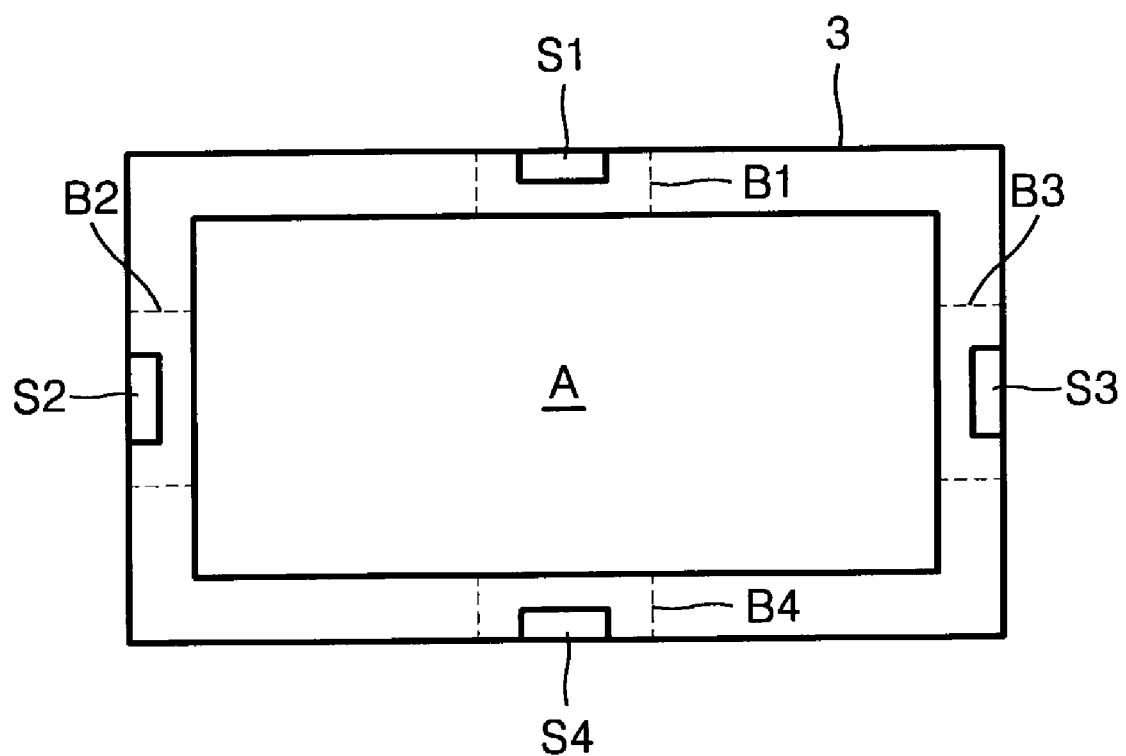
FIG. 3 is a rear view of a projection television screen of FIG. 2, showing the positions of optical sensors disposed inside the projection television screen.

FIG. 3 illustrates the positions of the first through fourth optical sensors S1, S2, S3, and S4 in the rear of the screen 3 of the projection television shown in FIG. 2, displaced from a visible region A. Referring to FIG. 3, the four optical sensors S1, S2, S3, and S4 are located at the upper center, middle left, lower center, and middle right, respectively, displaced from the visible region A of the screen 3. The first and fourth optical sensors S1 and S4 sense the vertical component of a convergence control image pattern, and the second and third optical sensors S2 and S3 sense the horizontal component thereof. In FIG. 3, reference characters B1, B2, B3, and B4 denote predetermined regions where the first through fourth optical sensors S1, S2, S3, and S4 are located, respectively, displaced from the visible region A of the screen 3 and onto which a convergence control image pattern is projected. The predetermined regions B1, B2, B3, and B4 correspond one-to-one to the optical sensors S1, S2, S3, and S4. In response to the convergence control pattern signal output from the pattern signal generator 54, the convergence control image pattern is projected onto the predetermined regions B1, B2, B3, and B4 of the screen 3. Since the predetermined regions B1, B2, B3, and B4 are displaced from the visible region A of the screen 3, the user is allowed to watch TV through the entire visible region A of the screen 3 while convergence control is performed.

A convergence control method using the projection television described above will be described below.

The convergence control method initially involves a step of detecting the generation of a sync signal of the input image signal when a power voltage is applied to the projection television. Here, the input image signal refers to the image signal input to the image signal decoder 42 from the image signal input port VidIn or the tuner 47. Upon first occurrence of a sync signal of the image signal, the pattern signal generator 54 generates a predetermined convergence control pattern signal under control of the main microcomputer 41 and the convergence microcomputer 52. Convergence control is performed in the predetermined regions B1, B2, B3, and B4 of the screen 3 using the convergence control pattern signal. When the convergence control is complete, the image signal is displayed.

According to the convergence control method described above, the convergence control is initiated by detection of the first occurrence of the sync signal of the input image signal and is performed in the predetermined regions B1, B2, B3, and B4 of the screen 3. Therefore, the user is allowed to continue watching projection TV regardless of the convergence control.

The procedure of convergence control using the convergence control pattern signal generated by the pattern signal generator 54 will be described. Initially, the convergence control pattern signal is input to the CRTs 1 through the image signal amplifier 43. Then, a convergence control image pattern corresponding to the convergence control pattern signal is projected onto the predetermined regions B1, B2, B3, and B4 displaced from the visible region A of the screen 3. Position signals of the projected convergence control image pattern are detected by the optical sensors S1, S2, S3, and S4. The detected position signals are converted into position data by the ADC 51. The quantity of current flowing across the convergence yoke CY of each of the CRTs 1 is adjusted by the convergence microcomputer 52 and the convergence control circuit 53 according to the position data.

Figure 4:
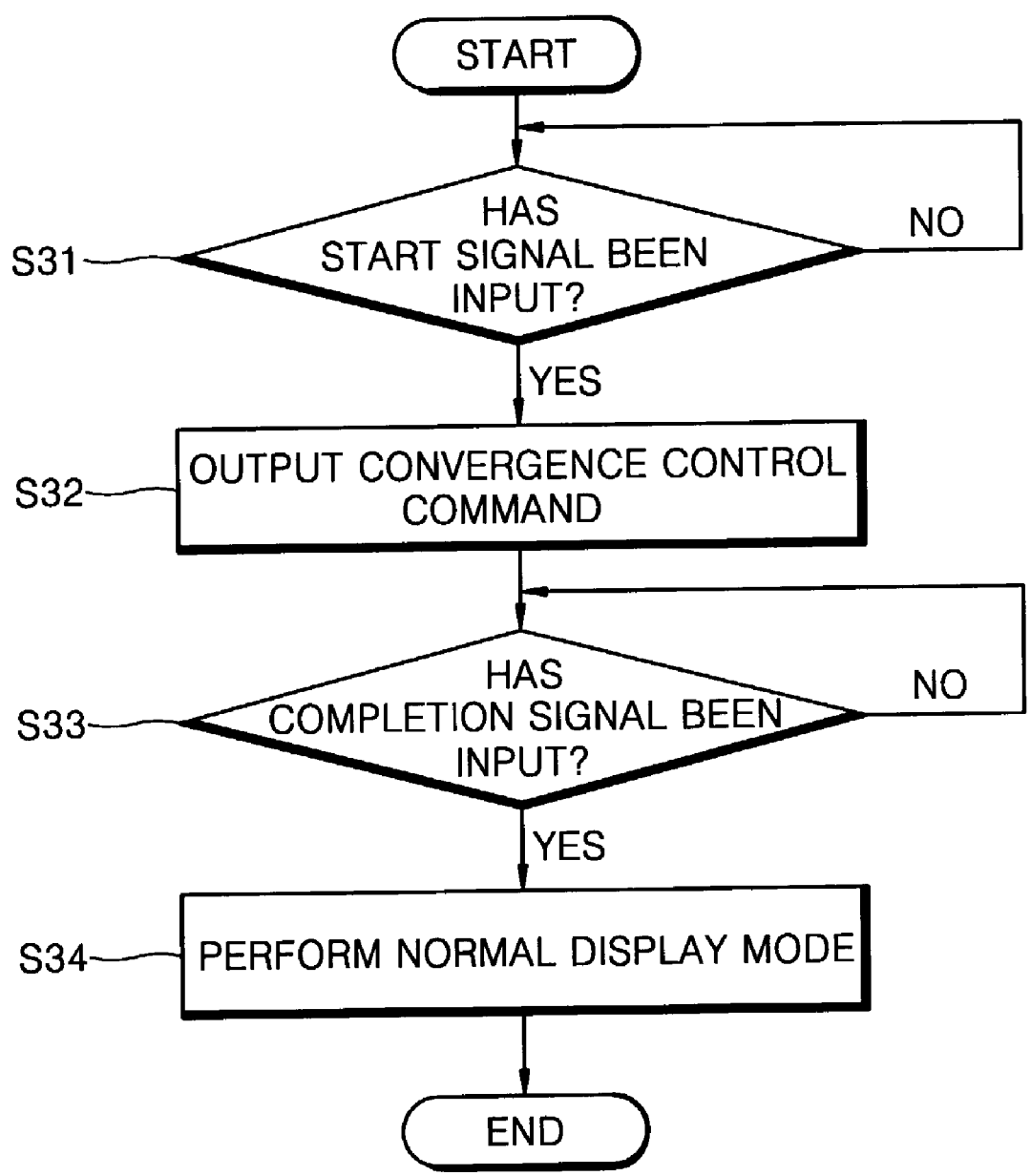
FIG. 4 is a flowchart of an algorithm of a main microcomputer of the projection television of FIG. 2.

The key algorithm of the main microcomputer 41 of the projection television of FIG. 2 will described with reference to FIGS. 2 and 4. If the start signal has been input (Step S31), the main microcomputer 41 outputs the convergence control command to the convergence microcomputer 52 (Step S32). In response to the convergence control command, the convergence microcomputer 52 adjusts the convergence by controlling the pattern signal generator 54 and the convergence control circuit 53. For the convergence adjustment, a convergence control image pattern is projected onto the predetermined regions B1, B2, B3, and B4. During the convergence adjustment, an actual image input through the image signal decoder 42 is projected onto the remaining region, the visible region A, of the screen 3, so the user is allowed to continue viewing the actual image. When a completion signal has been input from the convergence microcomputer 52 (step S33), the main microcomputer 41 performs a normal display mode (step S34).

Figure 5:
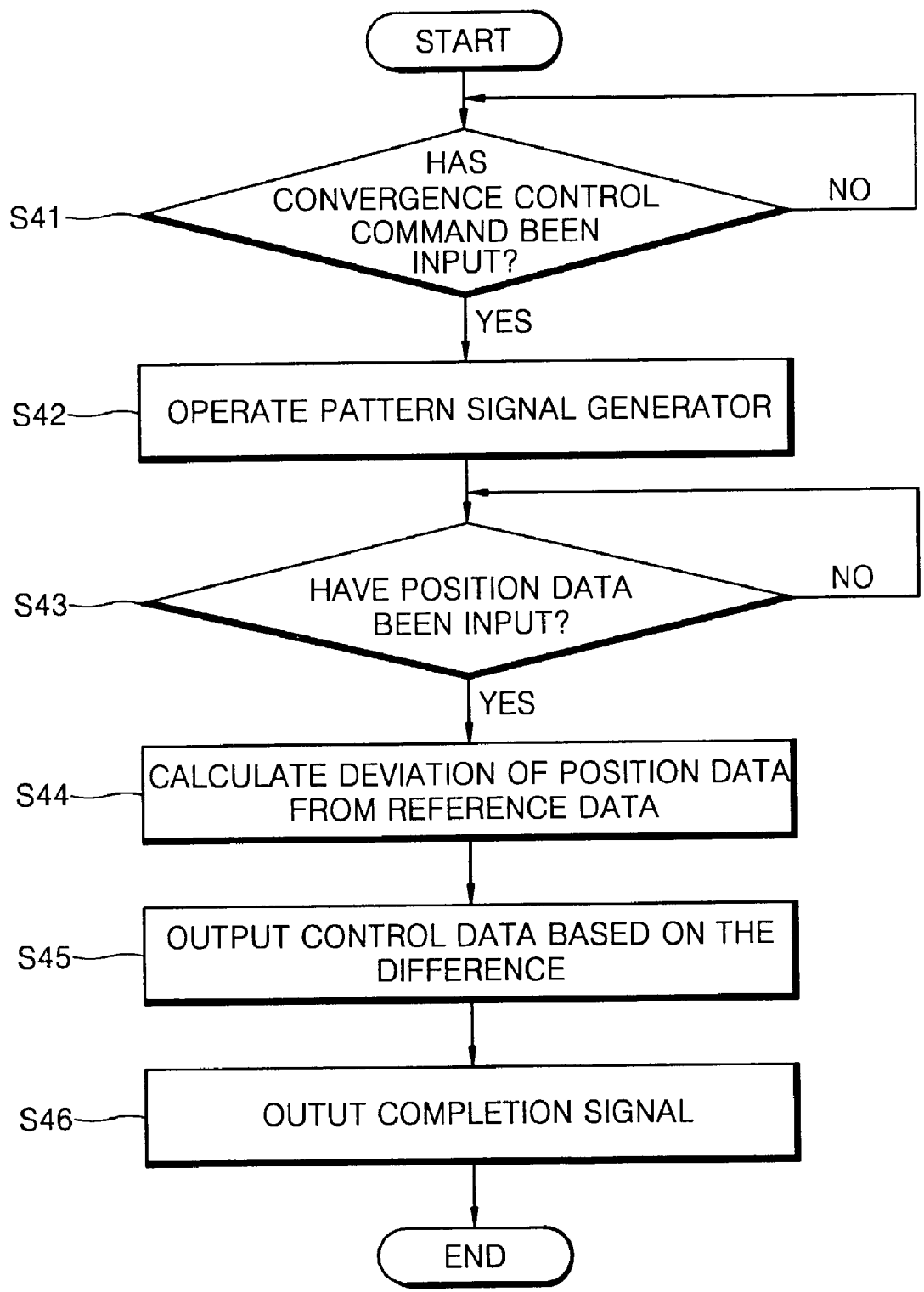
FIG. 5 is a flowchart of an algorithm of a convergence microcomputer of the projection television of FIG. 2.

An algorithm of the convergence microcomputer 52 of the projection television of FIG. 2 will be described with reference to FIGS. 2 and 5. When a convergence control command is input from the main microcomputer 41 (step S41), the convergence microcomputer 52 operates the pattern signal generator 54 (step S42). A convergence control image pattern corresponding to a convergence control pattern signal output from the pattern signal generator 54 is projected onto the predetermined regions B1, B2, B3, and B4 of the screen 3. The projected convergence control image pattern is sensed by the optical sensors S1, S2, S3, and S4, and position data of the projected convergence control image pattern is generated by the ADC 51. When the position data have been input from the ADC 51 (Step S43), the convergence microcomputer 52 calculates deviation of the input position data from the reference data stored in its memory (step S44) and outputs control data based on the deviation to the convergence control circuit 53 (step S45). The convergence control circuit 53 adjusts the quantity of current flowing across the convergence yoke CY of each of the CRTs 1 using the control data. Next, the convergence microcomputer 52 outputs a completion signal indicating the completion of convergence adjustment to the main microcomputer 41 (step S46). Accordingly, the main microcomputer 41 performs the normal display mode.

As described above, according to the projection television and convergence control method of the present invention, convergence control is performed using the predetermined regions B1, B2, B3, and B4 displaced from the visible region A of the screen 3, and an actual image is displayed on the visible region A of the screen 3. Therefore, a user of the convergence television is allowed to continue watching TV while the convergence control is performed.

While this invention has been particularly shown and described with reference to preferred embodiments thereof, they are for illustrative purposes and are not intended to limit the scope of the invention. Therefore, it will be understood by those skilled in the art that various changes in form and details may be made therein, for example, a predetermined limited region of the screen 3 for convergence control may be located at the corner of the screen 3. As another example, the invention need not be used only for projection television, but may be applied to other apparatus requiring convergence adjustment, such as a projection computer display. The spirit and scope of the invention is defined by the appended claims, rather than by the above-described preferred embodiment.

What is claimed is:

1. A projection television which magnifies images displayed on cathode ray tubes (CRTs) for the colors red, green, and blue using lenses and projects the magnified images onto a screen, the projection television comprising a convergence control apparatus capable of adjusting the convergence while an input image signal is displayed, the convergence control apparatus comprising:

an image signal decoder which processes the input image signal to generate a data signal, horizontal and vertical synchronous signals, and a start signal indicating the start of either the horizontal or vertical synchronous signal;

a convergence control unit which simultaneously projects a normal image signal output from the image signal decoder onto the screen and performs convergence control using a predetermined region around the screen displaced from a visible region of the screen according to a convergence control command; and a main microcomputer which inputs the convergence control command to the convergence control unit when the start signal is input from the image signal decoder, stops the convergence control when a completion signal is input from the convergence control unit, and performs a control operation to continuously display the image signal during the convergence control.

2. The projection television of claim 1, wherein the convergence control apparatus further comprises an image signal amplifier which amplifies one of the data signal from the image signal decoder and a predetermined convergence control pattern signal from the convergence control unit and outputs the amplified signal to the cathode ray tubes.

3. The projection television of claim 2, wherein the convergence control unit comprises:

a convergence microcontroller which generates a command to generate the predetermined convergence control pattern signal according to the convergence control command from the main microcomputer, the predetermined convergence control pattern signal for projecting a convergence control image pattern onto the predetermined region, and generates control data based on position data of the predetermined convergence control image pattern signal;

a pattern signal generator which generates the predetermined convergence control pattern signal in response to the command to generate the predetermined convergence control pattern signal, which is output from the convergence microcomputer, and inputs the predetermined convergence control pattern signal to the image signal amplifier;

optical sensors which are positioned at the predetermined region of the screen and generate position signals by sensing the convergence control image pattern projected onto the predetermined region of the screen according to the convergence control pattern signal;

an analog-to-digital converter which converts the position signals from the optical sensors into digital data and inputs the digital data as the position data to the convergence microcomputer; and a convergence control circuit which adjusts the quantity of current flowing across a convergence yoke of each of the CRTs according to the control data from the convergence microcomputer.

4. A convergence control method of a projection television which magnifies images displayed on cathode ray tubes (CRTs) for the colors red, green, and blue using lenses and projects the magnified images onto a screen, the convergence control method comprising:

when a power voltage is applied to the projection television, detecting the start of a synchronous signal of an input image signal;

when the start of the synchronous signal of the image signal is detected, generating a predetermined convergence control pattern signal; and adjusting the convergence of the projection television according to the predetermined convergence control pattern signal while a normal image is projected onto and displayed on the screen, wherein a convergence control image pattern corresponding to the convergence control pattern signal is projected onto a predetermined region around the screen displaced from a visible region of the screen to adjust the convergence.

5. The convergence control method of claim 4, wherein adjusting the convergence of the projection television comprises:

inputting the predetermined convergence control pattern signal to the cathode ray tubes;

detecting position data of the convergence control image pattern on the screen; and adjusting the quantity of current flowing across a convergence yoke of each of the cathode ray tubes according to the detected position data.

6. The convergence control method of claim 4, wherein the predetermined region of the screen onto which the convergence control image pattern is projected comprises an upper center region, a middle left region, a lower center region, and a middle right region all of which are displaced from the visible region of the screen.

* * * * *